73-628 SR

1/8/85 XR 4,492,120

United States Patent [19]

Lewis et al.

[11] Patent Number: 4,492,120

[45] Date of Patent: Jan. 8, 1985

[54] DUAL FUNCTION ULTRASONIC TRANSDUCER ASSEMBLY

[75] Inventors: George K. Lewis, Wyckoff; Franklin K. Sun, Tenafly, both of N.J.; Douglas L. Keene, Central Valley; Howard F. Fidel, Hartsdale, both of N.Y.

[73] Assignee: Irex Corporation, Ramsey, N.J.

[21] Appl. No.: 476,671

[22] Filed: Mar. 18, 1983

[51] Int. Cl.[3] .................... G01N 29/00

[52] U.S. Cl. .................... 73/625; 73/628; 73/641; 73/621; 73/597; 310/334; 310/336; 128/663

[58] Field of Search .................... 310/334, 336; 73/625, 73/628, 641, 621, 606, 601, 597, 592, 861.25; 128/663

[56] References Cited

U.S. PATENT DOCUMENTS

| | | | |
|---|---|---|---|
| 3,898,840 | 8/1975 | McElroy | 310/336 |
| 4,097,835 | 6/1978 | Green | 73/641 |
| 4,141,347 | 2/1979 | Green et al. | 128/663 |
| 4,257,278 | 3/1981 | Papadofrangakis et al. | 73/861.25 |

*Primary Examiner*—Howard A. Birmiel
*Attorney, Agent, or Firm*—Michael A. Kaufman; W. Brinton Yorks, Jr.

[57] ABSTRACT

A transducer assembly is provided which performs simultaneous imaging and flow measurement. Separate imaging and Doppler transducers are mounted on one face of the assembly. Each transducer type is backed by backing material which provides damping in accordance with the performance criteria of the different transducer types. The transducer types may be mechanically focused in the same direction so that flow measurements are made in the center of the area being imaged.

13 Claims, 5 Drawing Figures

FIG-1
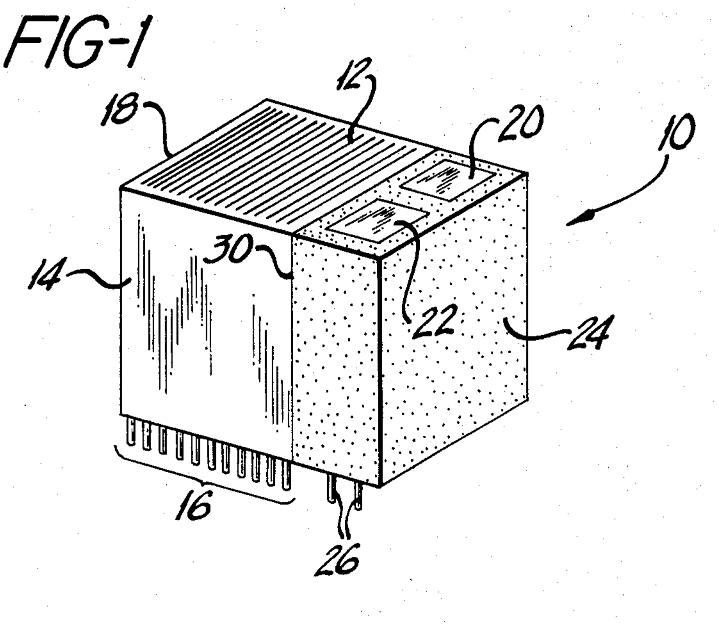
FIG-2
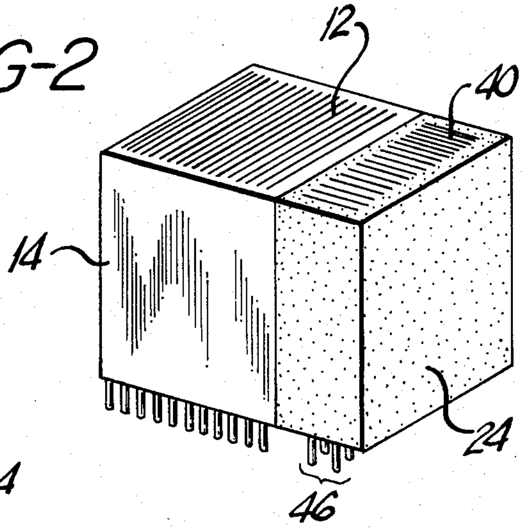
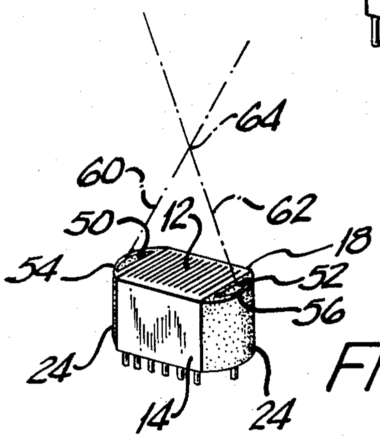
FIG-3

DUAL FUNCTION ULTRASONIC TRANSDUCER ASSEMBLY

This invention relates to ultrasonic transducers for medical diagnostic systems and, in particular, to transducer assemblies which are optimized to perform both ultrasonic imaging and Doppler flow measurement.

Ultrasonic medical diagnostic systems, and particularly those systems which are used for cardiac diagnosis, are useful for performing the functions of imaging and fluid flow measurement. In prior art systems the operation of a transducer is time multiplexed to perform the two functions. The transducer is first pulsed to transmit ultrasonic waves into the body, and returning echoes from the body tissue are detected to produce image information. The transducer is then switched to connect it to a Doppler system to cause the transducer to emit a pulsed or continuous wave Doppler signal. Echoes from the Doppler signal are gathered and measured to determine the flow rate of fluids such as blood in the body. By switching the transducer alternately between the imaging and Doppler electronic systems in a processor, the diagnostician can advantageously produce an image of the vessel in which he or she is making flow measurements.

There are drawbacks to such a multiplexed system, however. The transducer may be a multi-element transducer such as a linear array, which requires a separate signal lead for each element. A large number of switches is then required to switch all of the elements between the Doppler and imaging electronics. The large number of switches increases the cost of the system and presents a potential source of hardware failure. In addition, the switches can be electronically noisy, which will degrade the signal-to-noise performance of the system. It is desirable, then, to provide a Doppler and imaging system which overcomes the drawbacks of the multiplexed system.

In accordance with the principles of the present invention, a transducer assembly is provided for an ultrasonic diagnostic system which performs simultaneous imaging and flow measurement in a highly efficient manner. The assembly includes dedicated imaging and Doppler transducers on a common face of the assembly. Performance of the system is enhanced by providing backing matching and piezoelectric materials for the imaging and Doppler transducers which are optimized for the functional characteristics of the two types of transducers. The two types of transducers may be canted toward each other so that the Doppler signals are mechanically focused toward the center of the body region being imaged.

In the Drawings:

FIG. 1 illustrates a dual function transducer assembly for simultaneous imaging and Doppler flow measurement constructed in accordance with the principles of the present invention;

FIG. 2 illustrates an alternate embodiment of the present invention which is formed of linear array transducer elements;

FIG. 3 illustrates a further embodiment of the present invention in which the Doppler elements are separated by the imaging elements;

Figure 4:
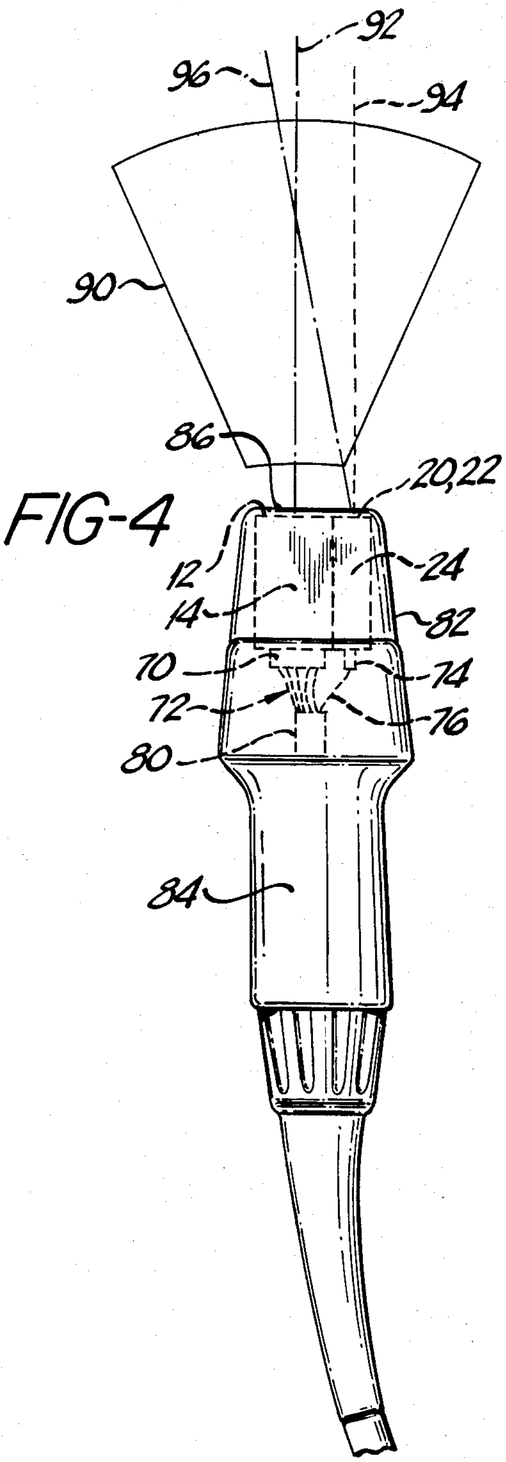
FIG. 4 illustrates a modified version of the transducer assembly of FIG. 1 which is installed in a scan head.

Referring to FIG. 1, an ultrasonic transducer assembly constructed in accordance with the principles of the present invention is shown. On the upper face 18 of the transducer assembly 10 is a linear array 12 of transducer elements. The number of elements in array 12 may typically number 32 or 48. Each element of the array 12 has a wire connected to the back of it. The wires extend through backing material 14, and are connected to a number of pins 16 at the bottom of the assembly. The linear array elements 12 send and receive ultrasonic energy for imaging.

Also on the upper face 18 of the transducer assembly 10 are two ultrasonic transducers 20 and 22 which send and receive ultrasonic energy for Doppler flow measurements. The transducers 20 and 22 are connected by wires which extend through backing material 24 to pins 26 at the bottom of the transducer assembly. For continuous wave Doppler operation, one of the transducers 20 or 22 will continuously transmit ultrasonic energy while the other transducer is used to continuously receive returning ultrasonic waves.

The transducers 12, 20, and 22 are typically composed of ceramic material such as lead titanate zirconate. The ceramic material for the imaging and Doppler transducers are chosen in accordance with the performance criteria required of the respective transducers. In a constructed embodiment of the assembly of FIG. 1, the array of imaging transducers was selected for operation at a nominal frequency of 3.5 MHz. Ceramic materials were selected for the two Doppler transducers 20 and 22 for nominal operation at 2.0 MHz. The selected transducers exhibited thicknesses of approximately one-half wavelength for the respective frequencies of operation. The higher frequency imaging transducer elements were thus thinner than the lower frequency Doppler transducer elements. The faces of the respective types of transducers are covered with quarter wavelength matching layers of an epoxy composite material to better match the ultrasonic impedance of the transducers to that of the human body.

The backing materials 14 and 24 for the two transducer types are also chosen in accordance with the performance criteria of the respective types of transducers. The backing materials are chosen to provide optimal axial resolution and accurate phasing of the ultrasonic signals. In particular, it is desirable to operate the imaging transducer array to transmit a short burst of ultrasonic energy of one or two cycles at the operating frequency for good resolution. Thus, the epoxy backing material 14 is chosen to heavily damp oscillations of the transducer array 12 so that a quick ring-down time of one or two cycles is afforded. The Doppler transducers 20 and 22, on the other hand, operate for much longer periods of time, such as 5, 10, or 12 cycles. The epoxy backing material 24 for the Doppler transducers is thus chosen to be less absorbent of ultrasonic energy and thereby provide a longer ring-down time for the Doppler transducers. The backing material 24 in the constructed embodiment comprises a softer, more gummy epoxy composition than the heavier backing material 14 for the imaging transducer array 12.

The constructed embodiment of the transducer assembly 10 of FIG. 1 was formed by fixing the two transducer types to their respective backing materials in separate operations. The transducer and backing material sub-assemblies were then glued together along the interface 30 to form the transducer assembly 10.

FIG. 4 shows a transducer assembly of the present invention mounted in a scan head 84. The transducer assembly is surrounded by a copper shield and is then potted in place in the end piece 82 of the scan head. The upper face 86 of the scan head end piece 82 is covered with a polyurethane coating which is acoustically transparent and exhibits a high electrical impedance. The upper face 86 is lapped smooth and provides a waterproof barrier between the patient and the transducer assembly.

A cable 80 extends through the scan head. Wires 72 and 76 of the cable are terminated at connectors 70 and 74 for the imaging and Doppler transducers. Connectors 70 and 74 mate with the pins 16 and 26 on the bottom of the transducer assembly.

The center-to-center dimension of the imaging transducer array and Doppler transducer array is of importance to the user. The imaging transducer array 12 will produce a sector image 90 of the patient's tissue, as shown in FIG. 4. The center of the sector 90 is aligned with the center line 92 of the transducer array 12. The center line of the Doppler elements 20 and 22 is offset from the imaging center line 92 as shown by the dashed line 94. It is desirable, however, for the Doppler center line to be substantially coextensive with that of the imaging array so that Doppler measurements can be made in a vessel which is approximately in the center of the image. This is accomplished in the embodiment of FIG. 4 by canting the Doppler portion of the transducer assembly face so that the center line 96 which is normal to the face of the Doppler transducers is substantially coextensive with the center line 92 of the imaging array in the center of the image. The faces of the Doppler transducers 20 and 22 are not coplanar with the imaging transducer array 12, but are tilted at a angle of approximately 3 degrees so that the center line 96 from the Doppler transducers will intersect the center line 92 of the imaging array at approximately the center of the image sector 90.

Figure 5:
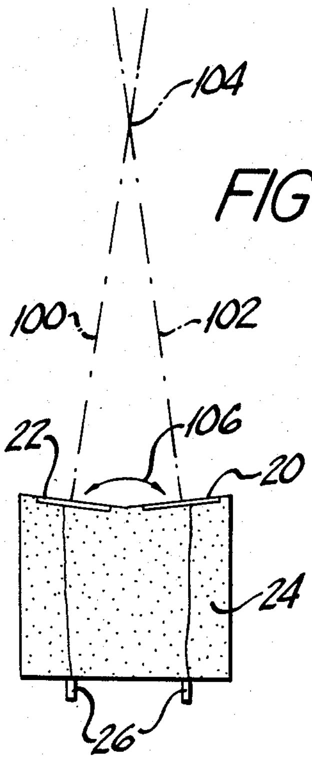
FIG. 5 is a detailed side view of the transducer assembly of FIG. 4.

For similar reasons it is desirable to cant the two Doppler transducers 20 and 22 toward each other as shown in FIG. 5. In FIG. 5, the transducer elements 20 and 22 are tilted toward each other at an angle shown as 106, such that the two center lines 100, 102 from the transducer intersect at a point 104 which is approximately in the plane of the image sector. The canting of the two Doppler transducer elements provides a measure of mechanical focusing so that the continuous transmission of ultrasonic energy along one of the center line paths 100 or 102 will result in the continuous return of echoes along the other path from a point 104 which is in the plane of the image.

The desire to tilt the two Doppler transducers toward each other as shown in FIG. 5 is obviated in the embodiment of FIG. 2, in which the Doppler function is performed by a linear array of transducer elements 40. Alternate ones of the transducer elements 40 in FIG. 2 may be energized for the transmission of Doppler waves, and the remaining interdigitated transducer elements used to continuously receive returning Doppler waves. Unlike the embodiment of FIG. 1, the interdigitation of Doppler transmit and receive elements of the embodiment of FIG. 2 permits the transmit and return paths of Doppler waves to be located in the image plane. The individual elements of the transducer array 40 of FIG. 2 are connected to a number of pins 46 at the bottom of the assembly in a similar manner as the connection of the imaging array elements to their respective pins.

A further embodiment of the present invention is shown in FIG. 3, in which the imaging array of transducers 12 is interposed between two Doppler transducers 50 and 52. The Doppler transducers 50 and 52 each exhibit a rounded, roughly crescentic shape. The Doppler transducers 50 and 52 are located on surfaces which are canted up and away from the plane of the imaging array 12, with edges 54 and 56 being higher than the plane of the imaging array 12. This canting of the Doppler elements 50 and 52 provides a degree of mechanical focusing of the Doppler waves similar to that provided by the tilted transducer elements of FIG. 5. In the embodiment of FIG. 3, however, the mechanical focal point 64 of the center line 60 and 62 of the two Doppler elements is aligned exactly over the center line of the plane of the image of imaging array 12. The rounded outer edges of the Doppler transducer elements 50 and 52 provide the transducer assembly of FIG. 3 with a generally rounded front surface 18. The transducer assembly of FIG. 3 may then be mounted in a rounded scan head which does not have corners that could cause discomfort when the scan head is pressed against the body of the patient.

What is claimed is:

1. A dual function ultrasonic transducer assembly for performing imaging and flow measurement comprising:

an upper surface including first transducer means, occupying a first area of said surface, for sending and receiving imaging signals, and second transducer means, occupying a second area of said surface, for sending and receiving flow measurement signals;

a first backing material, located between said first transducer means and a lower surface of said assembly, said first backing material chosen to have damping characteristics for the transmission and reception of imaging signals by said first transducers means; and a second backing material, located between said second transducer means and said lower surface of said assembly, said second backing material chosen to have damping characteristics for the transmission and reception of flow measurement signals by said second transducer means;

wherein said first and second backing materials are joined at a common interface.

2. The transducer assembly of claim 1, wherein said lower surface further comprises:

first electrode means, extending from said lower surface of said first backing material, and including electrode connections between said lower surface and said first transducer means for making electrical connection to said first transducer means; and second electrode means, extending from said lower surface of said second backing material, and including electrode connections between said lower surface and said second transducer means for making electrical connection to said second transducer means.

3. The transducer assembly of claim 1, wherein said first transducer means comprises a linear array of transducer elements and said second transducer means comprises first and second Doppler signal transducer elements.

4. The transducers assembly of claim 3, wherein said first and second Doppler signal transducers are canted toward each other at an oblique angle such that lines normal to the surfaces of said respective Doppler signal transducers intersect above said upper surface.

5. The transducer assembly of claim 1, wherein said first transducer means comprises a linear array of imaging transducer elements, and said second transducer means comprises a linear array of Doppler signal transducer elements.

6. The transducer assembly of claim 5, wherein said Doppler signal transducer elements are oriented normal to the orientation of said array of imaging transducer elements.

7. A dual function ultrasonic transducer assembly for performing imaging and flow measurement comprising:

an upper surface including first transducer means, occupying a first area of said surface, for sending and receiving imaging signals, wherein said first transducer means comprises a linear array of transducer elements and second transducer means, occupying a second area of said surface, for sending and receiving flow measurement signals, wherein said second transducer means comprises first and second Doppler signal transducer elements disposed on opposite sides of said linear array;

a first backing material, located between said first transducer means and a lower surface of said assembly, said first backing material chosen to have damping characteristics for the transmission and reception of imaging signals by said first transducer means; and a second backing material, located between said second transducer means and said lower surface of said assembly, said second backing material chosen to have damping characteristics for the transmission and reception of flow measurement signals by said second transducer means;

wherein said first and second backing materials are joined at a common interface.

8. The transducer assembly of claim 7, wherein said first and second Doppler signal transducer elements each exhibits a substantially crescentic shape with a concave edge oriented away from said linear array so as to give said upper surface a roughly rounded shape.

9. The transducer assembly of claim 7, wherein said first and second Doppler signal transducer elements have surfaces located in planes which are oblique to the plane of said linear array so that lines normal to said Doppler signal transducer elements intersect above approximately the center of said linear array.

10. The transducer assembly of claim 1, wherein said second transducer means is located in a plane which is canted toward the plane of said first transducer means such that a line normal to the surface of said second transducer means passes above said first transducer means.

11. A dual function ultrasonic transducer assembly comprising:

a linear array of first transducer elements, having a given nominal center frequency of operation, and located on a first surface of said assembly;

a plurality of second transducer elements, having a given nominal center frequency of operation which is different from said nominal center frequency of said first transducer elements, and located on said first surface of said assembly;

a first backing material, located behind said array of first transducer elements for heavily damping oscillations of said first transducer elements for the provision of a relatively quick ring-down time for said first transducer elements; and a second backing material, located behind said plurality of second transducer elements for damping oscillations of said second transducer elements for the provision of a relatively long ring-down time for said second transducer elements.

12. The transducer assembly of claim 11, wherein said first transducer elements comprise a linear array of imaging elements and wherein said second transducer elements comprise Doppler signal transducer elements operated at a lower nominal center frequency than said imaging transducer elements.

13. The transducer assembly of claim 12, wherein said first backing material is an epoxy-based material and wherein said second backing material is an epoxy-based material which is softer in composition than said first backing material.

* * * * *